United States Patent
Brown et al.

(10) Patent No.: US 9,092,612 B2
(45) Date of Patent: Jul. 28, 2015

(54) METHOD AND SYSTEM FOR SECURE ACCESS TO DATA FILES COPIED ONTO A SECOND STORAGE DEVICE FROM A FIRST STORAGE DEVICE

(71) Applicant: Google Technology Holdings LLC, Mountain View, CA (US)

(72) Inventors: William J. Brown, Redwood City, CA (US); James M. Hunter, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 24 days.

(21) Appl. No.: 13/677,755

(22) Filed: Nov. 15, 2012

(65) Prior Publication Data

US 2014/0136807 A1 May 15, 2014

(51) Int. Cl.
| | |
|---|---|
| G06F 12/00 | (2006.01) |
| G06F 21/44 | (2013.01) |
| H04L 9/00 | (2006.01) |
| G06F 12/14 | (2006.01) |
| G06F 21/00 | (2013.01) |
| G06F 11/14 | (2006.01) |
| G06F 21/62 | (2013.01) |
| G06F 3/06 | (2006.01) |
| G06F 17/30 | (2006.01) |
| H04L 29/08 | (2006.01) |
| H04L 29/06 | (2006.01) |

(52) U.S. Cl.
CPC *G06F 21/44* (2013.01); *G06F 3/06* (2013.01); *G06F 11/1458* (2013.01); *G06F 12/14* (2013.01); *G06F 12/1408* (2013.01); *G06F 17/30* (2013.01); *G06F 21/00* (2013.01); *G06F 21/6209* (2013.01); *H04L 9/00* (2013.01); *G06F 2221/2107* (2013.01); *H04L 63/0435* (2013.01); *H04L 63/10* (2013.01); *H04L 67/1097* (2013.01)

(58) Field of Classification Search
CPC ..... G06F 12/14; G06F 12/1408; G06F 21/00; H04L 9/00
See application file for complete search history.

(56) References Cited

U.S. PATENT DOCUMENTS

| | | | |
|---|---|---|---|
| 7,865,738 B2 | 1/2011 | Buck et al. | |
| 7,971,071 B2 | 6/2011 | Walkoe et al. | |

(Continued)

FOREIGN PATENT DOCUMENTS

EP 2182457 A1 5/2010

OTHER PUBLICATIONS

Patent Cooperation Treaty, International Search Report and Written Opinion of the International Searching Authority for International Application No. PCT/US2013/068197, Mar. 24, 2014, 13 pages.

*Primary Examiner* — Shawn X Gu
(74) *Attorney, Agent, or Firm* — Morris & Kamlay LLP

(57) ABSTRACT

A method and system for secure access to data files copied onto a second storage device from a first storage device. A computer receives data from a first storage device that is in communication with the computer. A data file is stored to a second storage device. A passkey is generated and associated with the data file. A passkey image file corresponding to the passkey is generated. The passkey image file is transmitted to the first storage device for storage. Subsequent access to the data file on the second storage device requires entry of the passkey. The passkey is only accessible to a user that has access to read the passkey image file on the first storage device.

20 Claims, 7 Drawing Sheets

(56) References Cited

U.S. PATENT DOCUMENTS

| | | |
|---|---|---|
| 2001/0037468 A1 | 11/2001 | Gaddis |
| 2005/0060554 A1* | 3/2005 | O'Donoghue ............... 713/183 |
| 2007/0038857 A1 | 2/2007 | Gosnell |
| 2010/0186074 A1 | 7/2010 | Stavrou et al. |
| 2010/0287382 A1 | 11/2010 | Gyorffy et al. |
| 2011/0087690 A1* | 4/2011 | Cairns ........................ 707/769 |
| 2013/0166923 A1* | 6/2013 | Tsuhara ...................... 713/193 |

* cited by examiner

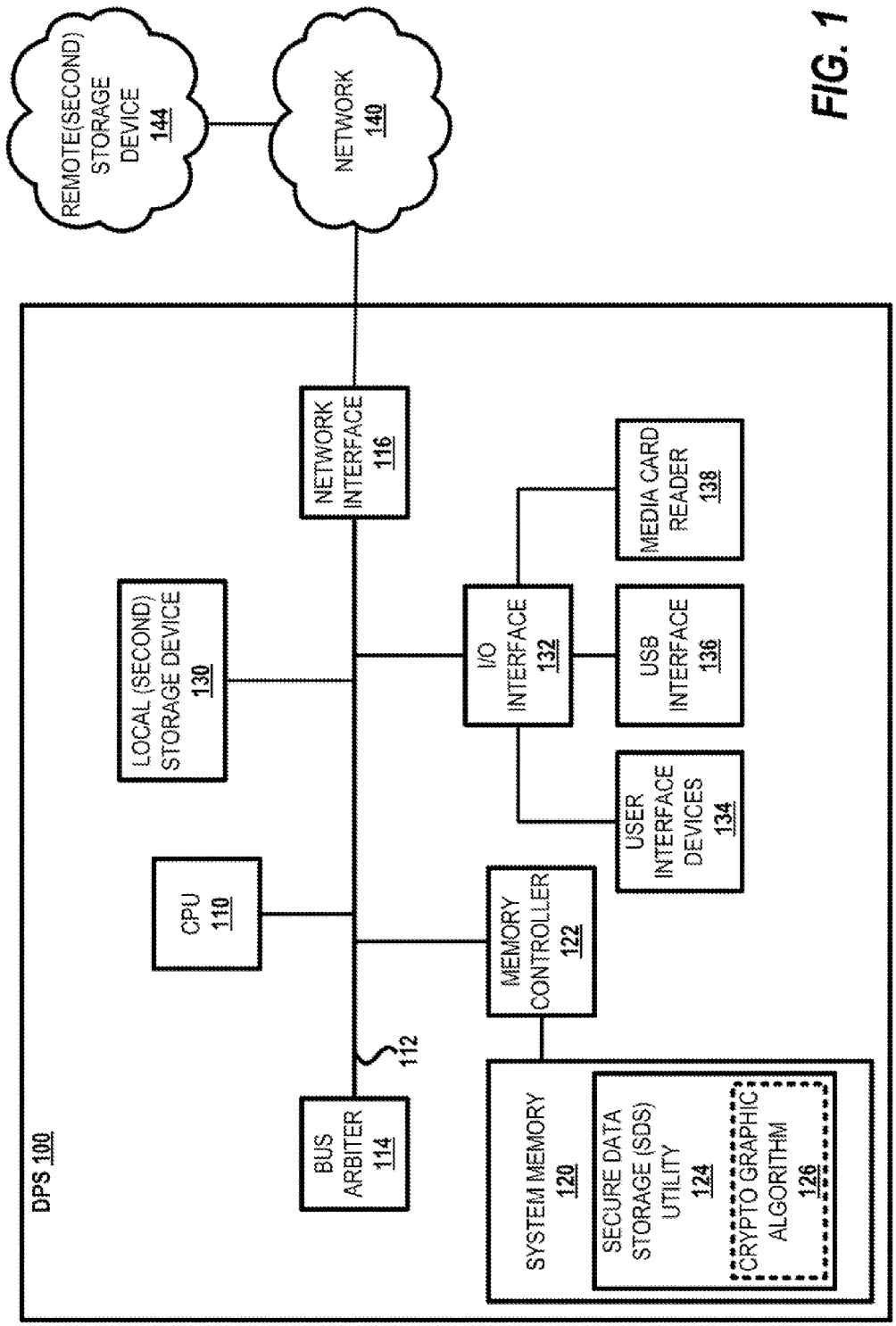

METHOD AND SYSTEM FOR SECURE ACCESS TO DATA FILES COPIED ONTO A SECOND STORAGE DEVICE FROM A FIRST STORAGE DEVICE

BACKGROUND

1. Technical Field

The present disclosure generally relates to data storage systems. More specifically, the present disclosure relates to providing security to data transferred from a first storage device and stored on a second storage device.

2. Description of the Related Art

Mobile electronic devices such as digital cameras, flash drives, laptop computers and mobile phones contain one or more digital storage devices such as solid state flash memory. Various types of data can be stored on the digital storage devices. For example, the storage devices may contain text data, images and videos. It is often desirable to copy or backup the data from the digital storage devices to a separate data storage facility in order to safeguard and prevent loss of the data. The backup version of the data can be accessed at a future time period.

BRIEF DESCRIPTION OF THE DRAWINGS

The description of the illustrative embodiments is to be read in conjunction with the accompanying drawings, wherein:

FIG. 1 provides a block diagram representation of an example data processing system within which one or more of the described embodiments can be practiced;

DETAILED DESCRIPTION

Figure 2A:
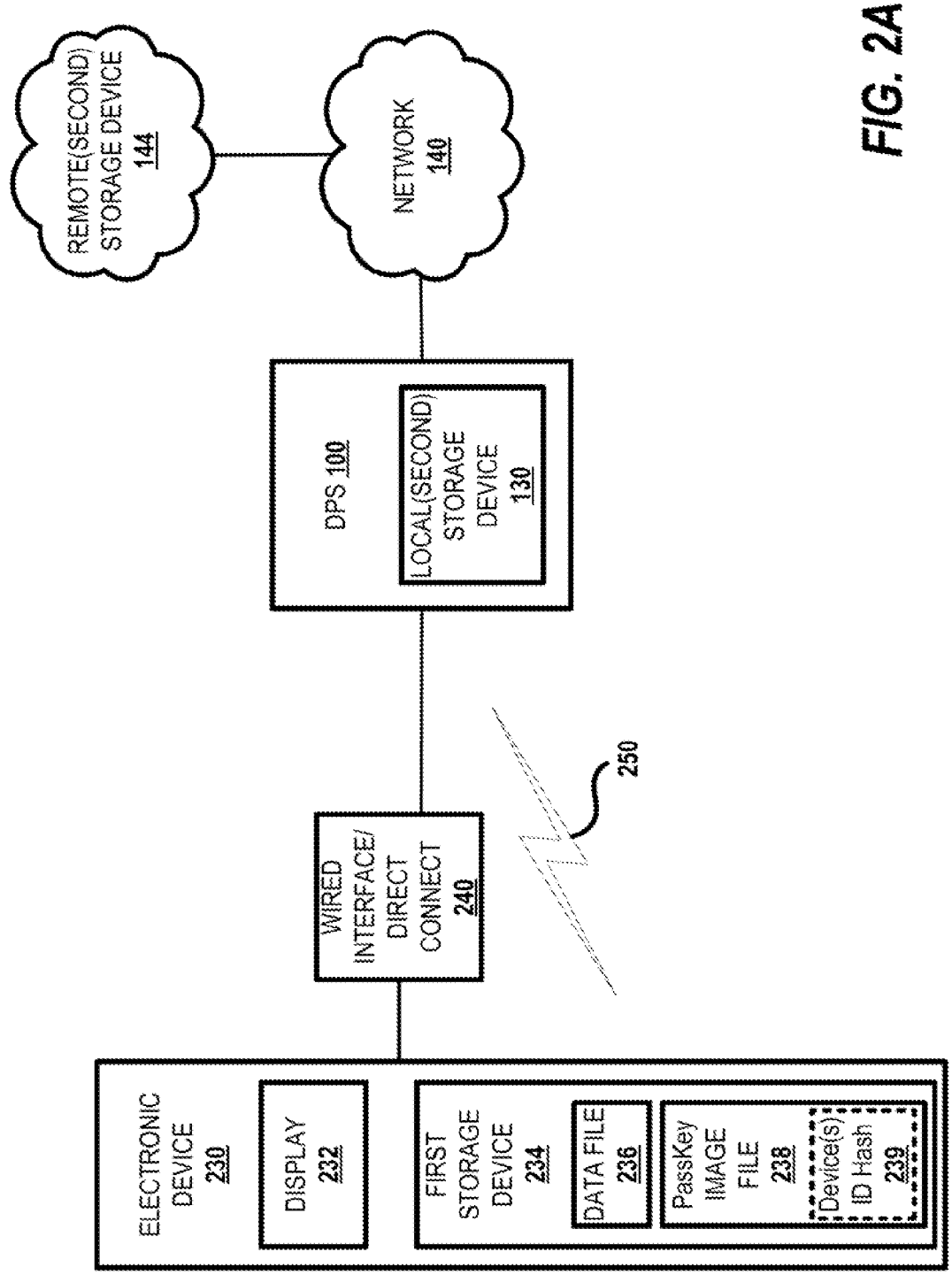
FIG. 2A illustrates a block diagram representation of an electronic device connected to a data processing system through a wired interface according to one embodiment.

The illustrative embodiments provide a method and system for secure access to data files copied onto a second storage device from a first storage device. A computer receives a data file from a first storage device that is communicatively connected to the computer. The computer encrypts the data file and stores the encrypted data file to a second storage device. The computer generates a passkey and associates the passkey with the encrypted data file. The computer also generates a passkey image file corresponding to the passkey, and the computer transmits the passkey image file to the first storage device for storage thereon. Subsequent access to the data file on the second storage device requires entry of the passkey. However, the passkey is made available only to a user who has access to read the passkey image file on the first storage device.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

With reference now to the figures, and beginning with FIG. 1, there is depicted a block diagram representation of an example data processing system (DPS), as utilized within one embodiment. The data processing system is described as having features common to a server or personal computer, including hand held and/or portable computers. However, as used herein, the term "data processing system", is intended to include any type of computing device or machine that is capable of receiving and storing data and running a software program. In addition to the different types of computer systems, the computing device or machine can also include communication devices such as routers and switches and consumer devices such as mobile computers, home automation systems and multimedia viewing systems.

FIG. 1 and the following discussion are intended to provide a brief, general description of an exemplary data processing system adapted to implement the described embodiments. While embodiments will be described in the general context of instructions residing on hardware within a server computer, those skilled in the art will recognize that embodiments may be implemented via a combination of program modules. Generally, program modules include routines, programs, components, and data structures, which perform particular tasks. The disclosure may also be practiced in distributed computing environments where tasks are performed by remote processing devices that are linked through a communications network. In a distributed computing environment, program modules may be located in both local and remote memory storage devices.

DPS 100 can include a processor or central processing unit (CPU) 110, a system memory 120 coupled to a memory controller 122, and a system interconnect fabric 112 that couples memory controller 122 to central processing unit 110 and other components of DPS 100. In one embodiment, system interconnect fabric 112 can be an address and data bus. Commands on system interconnect fabric 112 are communicated to various system components under the control of bus arbiter 114. System memory 120 is a computer readable storage medium/device that stores data and software programs and code that can be executed on CPU 110. System memory 120 can contain secure data storage (SDS) utility 124 which executes on CPU 110 to perform the various functional processes described herein, and illustrated by the various figures. In one embodiment, system memory 120 also contains cryptographic algorithm 126 that can be used to encrypt and decrypt data. In one implementation, cryptographic algorithm 126 is a functional sub-routine within SDS utility 124. Various other software-enable programs or functions can be provided within system memory 120 and/or SDS utility 124, including for example, a user interface application (not shown) by which user interface features described by the method of FIG. 5 can be completed.

Data processing system 100 further includes computer readable storage devices, including one or more local storage devices 130, such as a hard disk drive. Local storage devices 130 can be communicatively coupled to system interconnect fabric 112. Local storage devices 130 provide nonvolatile storage for DPS 100. Although the description of a computer readable storage device (and specifically local storage devices 130) refers to a hard disk, it should be appreciated by those skilled in the art that other types of media which are readable by a computer, such as removable magnetic disks, CD-ROM disks, magnetic cassettes, flash memory cards, digital video disks, Bernoulli cartridges, and other later-developed hardware, may also be used in the exemplary computer operating environment. According to one aspect of the disclosure, local storage device 130 can represent a second storage device on which data files received from a first storage device are stored. In this scenario, local storage device 130 can be interchangeably referred to as a second storage device.

DPS 100 also includes a plurality of user interface devices 134, which can be communicatively coupled to system interconnect fabric 112 by an input-output (I/O) interface 132. User interface devices 134 allow a user to provide input and receive output from DPS 100. For example, user interface devices 134 can include one or more displays, keyboards, and pointing devices, such as a mouse. A USB interface 136 and a media card reader 138 can also be communicatively coupled to system interconnect fabric 112 through I/O interface 132. As will become clearer in the descriptions which follow, USB interface 136 can be utilized to enable a direct connection to DPS 100 of a source device having a first storage device. In this configuration, USB interface 136 can then support the exchange of data files between the first storage device and DPS 100 and the transmitting of passkey image files from DPS 100 to the first storage device. In one embodiment, media card reader 138 enables direct physical insertion of the first storage device, such as a media card, and a direct reading of data or files from the first storage device by DPS 100 and direct transfer and/or storage of the password image file to/on the first storage device.

DPS 100 further includes a network interface 116 by which DPS 100 can connect to a network 140. As depicted in FIG. 1, the logical connections can include connections over network 140. It will be appreciated that the network connections shown are exemplary and other means of establishing communication may be used. In an embodiment, network 140 may be a local area network (LAN). In alternative embodiments, network 140 may include a wide area network (WAN), such as the Internet, or a personal area network. Network 140 enables access to resources and other components external to and/or outside of DPS 100. In the illustrative embodiment, one such resource/component is remote storage device 144. Remote storage device 144 is communicatively connected to DPS 100 via network 140. In one embodiment, remote storage device 144 can represent the second storage device on which data files received from a first storage device are stored. In this scenario, remote storage device 144 can be interchangeably referred to as the second storage device. It is also possible that both local storage device 130 and remote storage device 144 can be selectably utilized as the second storage device depending on the configuration of the DPS 100 and/or the specific operational settings of the SDS utility 124. For example, one embodiment can provide that data files of a particular pre-set maximum size are automatically stored at the local storage device 130 during processing by SDS utility 124, while other data files that surpass the pre-set maximum size are automatically stored at the remote storage device 144.

Remote storage devices 144 can be a virtualized cloud storage pool that uses storage media such as redundant arrays of hard disk drives. DPS 100 may operate in a networked environment using logical connections to one or more second storage devices 144. Second storage devices 144 can be utilized to store data files that are transmitted from DPS 100 to second storage devices 144. In a networked environment, program modules employed by DPS 100, or portions of program modules employed by DPS 100, may be stored in second storage devices 144 and downloaded to system memory 120 or local storage device 130 as needed during processing of the particular program/application.

FIG. 2A illustrates an electronic device connected to a data processing system through a direct connection via a wired interface and/or a wireless interface, according to one or more embodiments. In one embodiment, electronic device 230 is communicatively coupled to DPS 100 via wired interface 240 which provides a direct connection. In an alternate embodiment, electronic device 230 is communicatively coupled to DPS 100 via a wireless (or over-the-air) interface 250, such as Bluetooth® or other short range wireless communication (data exchange) protocol. Electronic device 230 can be one of a wide variety of digital/electronic devices such as a digital camera, mobile phone, smartphone, portable music player, personal digital assistant, personnel computer, laptop computer, tablet computer or other digital device that has a storage device. Electronic device 230 includes a display 232. Various types of displays can be utilized for display 232 such as liquid crystal displays (LCD) or organic light emitting diode displays (OLED).

As further illustrated, electronic device 230 includes a local storage and/or a memory device, generally and/or collectively referred to hereinafter as first storage device 234. First storage device 234 can be a non-volatile memory device. First storage device 234 can be internal to electronic device 230 or can be a removable storage device that is detachable from electronic device 230. Examples of removable storage devices include memory cards, memory sticks and flash memory. In an embodiment, electronic device 230 can record photographs and/or videos and store the photographs and/or videos as image data 236 on first storage device 234. In one embodiment, electronic device 230 can also record audio data, which are also stored on first storage device 234. In another embodiment, electronic device 230 can create and store various types of information as raw data 236 on first storage device 234. According to one aspect of the disclosure, first storage device 234 can also store a passkey image file 238. Passkey image file 238 can contain at least one device ID hash 239, in one embodiment. The device ID hash is a hash of one or more of a source storage device ID, a destination storage device ID, and/or an ID pairing of the source and destination storage devices. In an alternate embodiment, presented by the below described FIG. 2B, device ID hash 239 can be a separate image or data file from passkey image file 238. Passkey image file 238 and device ID hash 239 are explained in detail with the description of FIG. 3.

Electronic device 230 can be communicatively coupled to a wired interface/direct connection 240 which places electronic device 230 in direct communication with DPS 100.

DPS 100 includes a local storage device 130, and DPS 100 is communicatively coupled to a remote storage device 144 via network 140. One or both of local storage device 130 and remote storage device 144 can be the second storage device that receives a copy of data file 236 from first storage device 234 of electronic device 230. Remote storage device 144 can comprise different types of storage media and in different configurations. As an example, remote storage device 144 can comprise a redundant array of independent disks (RAID) storage system and remote storage device 144 can be a distributed storage system, such as a cloud storage system.

As introduced above, in one embodiment, wired interface 240 is an electrical cable connected to USB interface 136 of DPS 100. In another embodiment, first storage device 234 can be removed from electronic device 230 and communicatively coupled to card reader 138 of DPS 100. DPS 100 can receive data 236 and/or a data file comprising data (236) transmitted from electronic device 230. Data 236 stored on first storage device 234 can be transmitted through wired interface 240 to DPS 100 for storage on local storage device 130. Alternatively, data 236 stored on first storage device 234 can be transmitted through wired interface 240 to DPS 100 and then forwarded for storage on remote storage device 144 via network 140. Information stored on electronic device 230 and specifically on first storage device 234 can be used to view data previously stored on local storage device 130 and/or remote storage device 144.

Figure 2B:
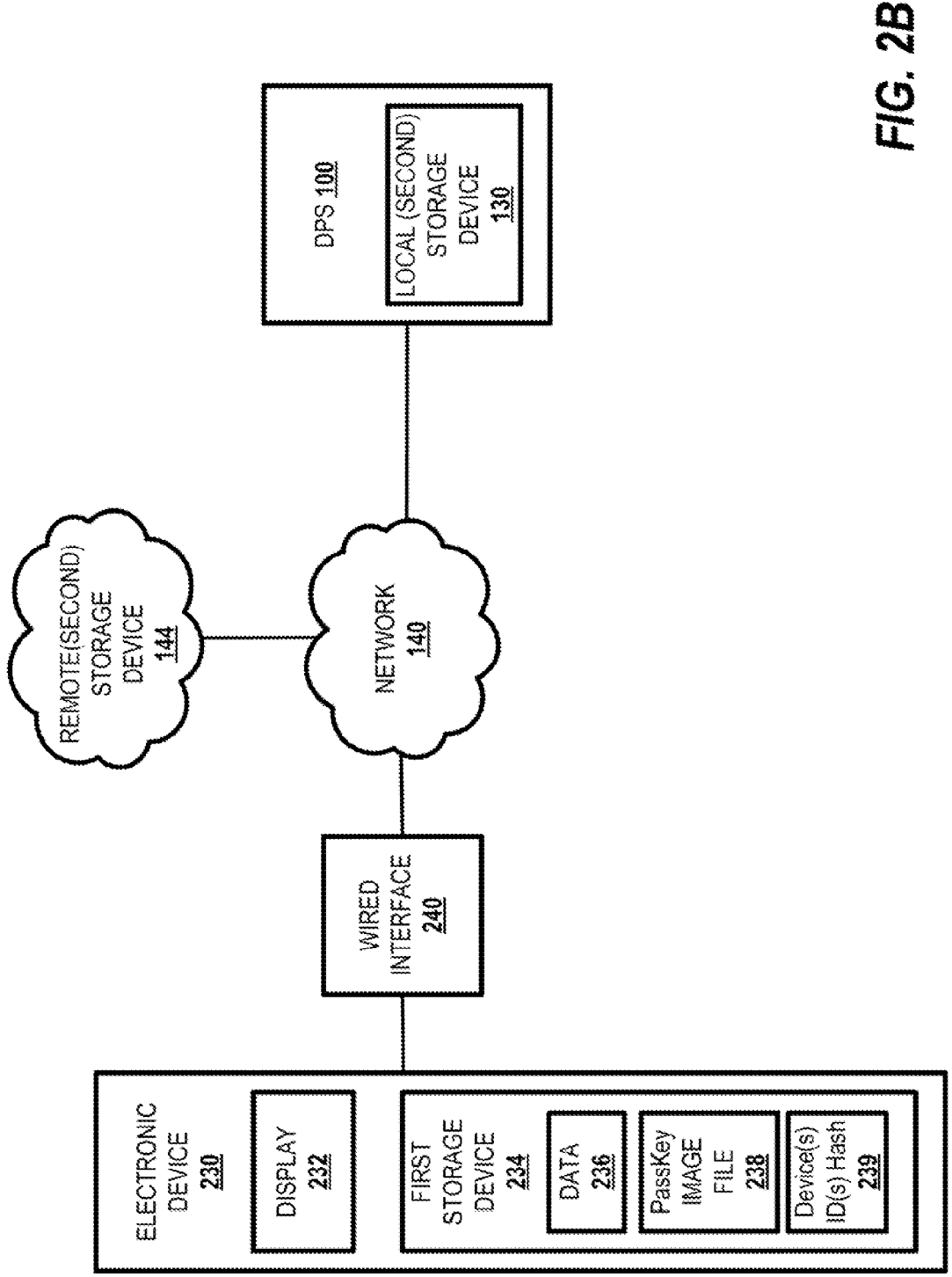
FIG. 2B illustrates a block diagram representation of an electronic device connected to a data processing system through a wired network according to one embodiment.

FIG. 2B illustrates an electronic device connected to a data processing system through a network interface according to an embodiment. Electronic device 230 is communicatively coupled to network 140 via a wired interface 240. Electronic device 230 can be communicatively coupled network 140 via a wired interface 240. Also communicatively coupled to network 140 is DPS 100 and remote storage device 144. DPS 100 includes a local storage device 130. As provided with FIG. 2A, electronic device 230 includes a display 232 and local storage and/or a memory device, generally and/or collectively referred to hereinafter as first storage device 234. First storage device 234 is a non-volatile memory device that can be internal to electronic device 230 or can be a removable storage device that is detachable from electronic device 230. Stored within first storage device 234 are data 236 or data files, which can include recorded audio data, video data, image data, and text-based data. First storage device 234 can also store passkey image file 238 and device ID hash 239 following processing of SDS utility 124 that occurs on DS 100. Passkey image file 238 and device ID 239 are explained in detail with the description of FIG. 3.

In one embodiment, wired interface 240 is a hard wired connection with a device such as a personal computer that is connected to the Internet. For example, electronic device 230 can be connected to wired interface 240 that includes an electrical cable connected to a USB port on a personal computer with an internet connection. In an additional embodiment, first storage device 234 can be physically removed from electronic device 230 and connected directly with a data reader/writer component associated with wired interface 240. Data 236 stored on first storage device 234 can be transmitted through wired interface 240 and network 140 to DPS 100 for storage on one or more of local storage device 130 and/or remote storage device 144 operating as second storage devices. DPS 100 can receive data 236 transmitted from electronic device 230. In one embodiment, electronic device 230 can be used to access and view data previously stored on one or both of local storage device 130 and/or remote storage device 144 utilizing the device ID hash 239, as described in greater detail with the FIG. 5 description.

Figure 2C:
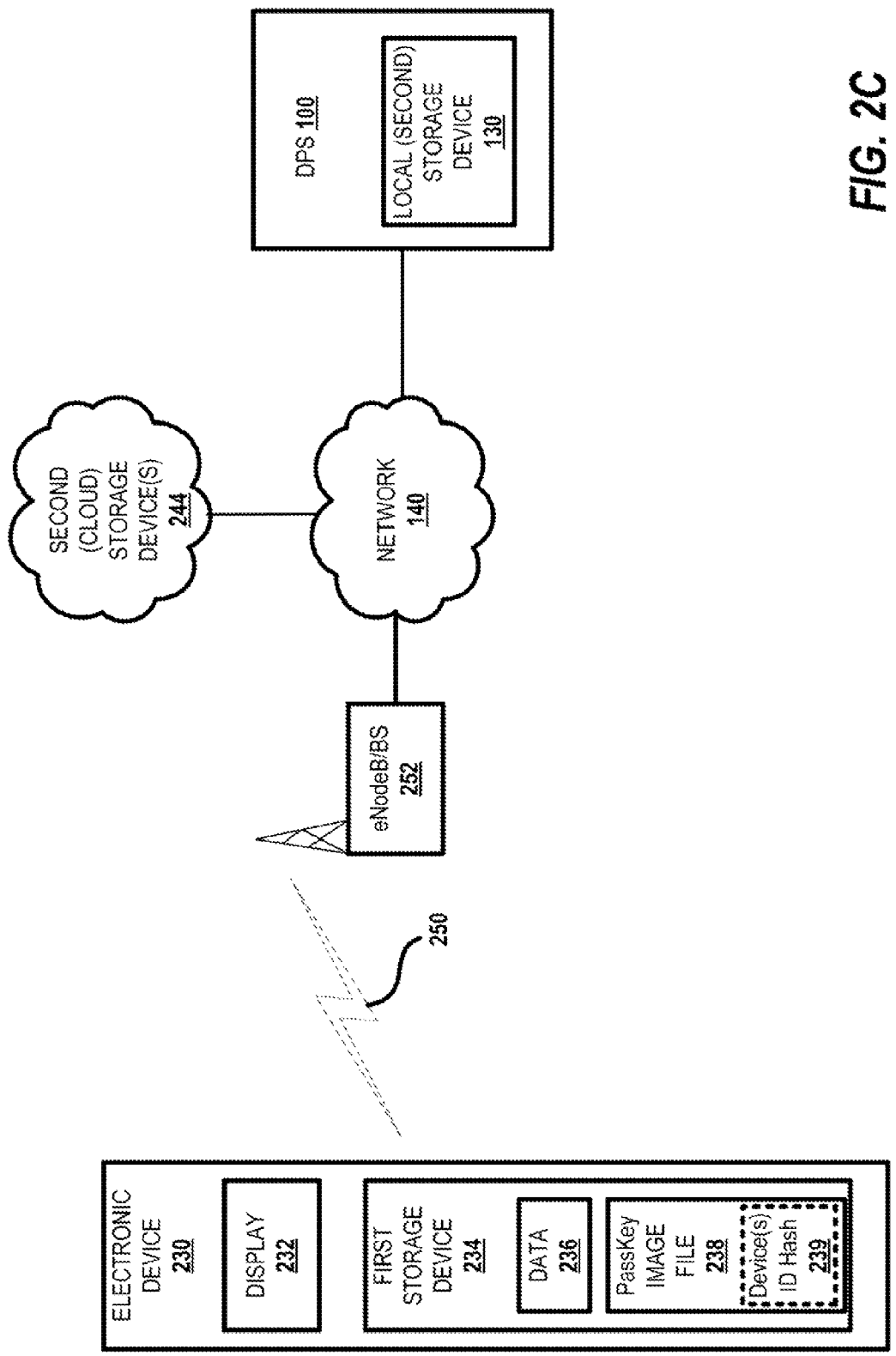
FIG. 2C illustrates a block diagram representation of an electronic device connected to a data processing system through a wireless network according to one embodiment.

FIG. 2C illustrates an electronic device connected to a data processing system through a wireless network according to an embodiment. Electronic device 230 is communicatively coupled to network 140 via a wireless connection or interface 250 through an evolution Node B (eNodeB)/base station (BS) 252 (hereinafter base station 252). With this embodiment, electronic device 230 can be one of a wide variety of digital/electronic devices that can communicate via wireless transmission over a wireless network, including devices such as a mobile phone, smartphone, personal digital assistant, personnel computer, laptop computer, tablet computer or other digital device. Electronic device 230 includes a display 232 and a local storage and/or a memory device, generally and/or collectively referred to hereinafter as first storage device 234. First storage device 234 can be a non-volatile memory device and can be internal to electronic device 230 or can be a removable storage device that is detachable from electronic device 230. Stored within first storage device 234 are data 236 or data files, which can include recorded audio data, video data, image data, and text-based data. First storage device 234 can also store passkey image file 238 and device ID hash 239 following processing of SDS utility 124 that occurs on DPS 100.

Electronic device 230 can be communicatively coupled to base station 252 via a wireless interface 250. Base station 252 is communicatively coupled to network 140, which enables electronic device to also be communicatively coupled to DPS 100 and/or second storage device 244. In one or more embodiments, second storage devices 244 can be a virtualized cloud storage pool that can comprise storage media of different types and in different configurations. As an example, second storage devices 244 and/or cloud storage pool can comprise a redundant array of independent disks (RAID) storage system. Second storage devices 244 can be located at one or more remote locations of network 140 that can be separate from the location of DPS 100. DPS 100 includes a local storage device 130.

Electronic device 230 can be communicatively coupled to and in communication with DPS 100 via a communication path involving wireless interface 250, base station 252, and network 140. Electronic device 230 is capable of wide-area or local wireless communication with other mobile wireless devices or with base stations 252 that are at a fixed location. DPS 100 can receive data 236 transmitted from electronic device 230, and data 236 stored on first storage device 234 can be transmitted through wireless interface 250 to DPS 100 through base stations 252 and network 140. DPS 100 can store data 236 directly to local storage device 130 and/or to cloud storage device (244) through network 140. In one embodiment, electronic device 230 can be used to access and view data previously stored on one or both of local storage device 130 and/or cloud storage device 244 utilizing the device ID hash 239, as described in greater detail with the FIG. 5 description.

Those of ordinary skill in the art will appreciate that the hardware components and basic configuration depicted in FIG. 1 and FIGS. 2A-2C may vary. The illustrative components within DPS 100 and electronic device(s) 230 are not intended to be exhaustive, but rather are representative to highlight essential components that can be utilized to implement aspects of the present disclosure. For example, other devices/components may be used in addition to or in place of the hardware depicted. The depicted example is not meant to imply architectural or other limitations with respect to the presently described embodiments and/or the general concepts presented by the disclosure.

Figure 3:
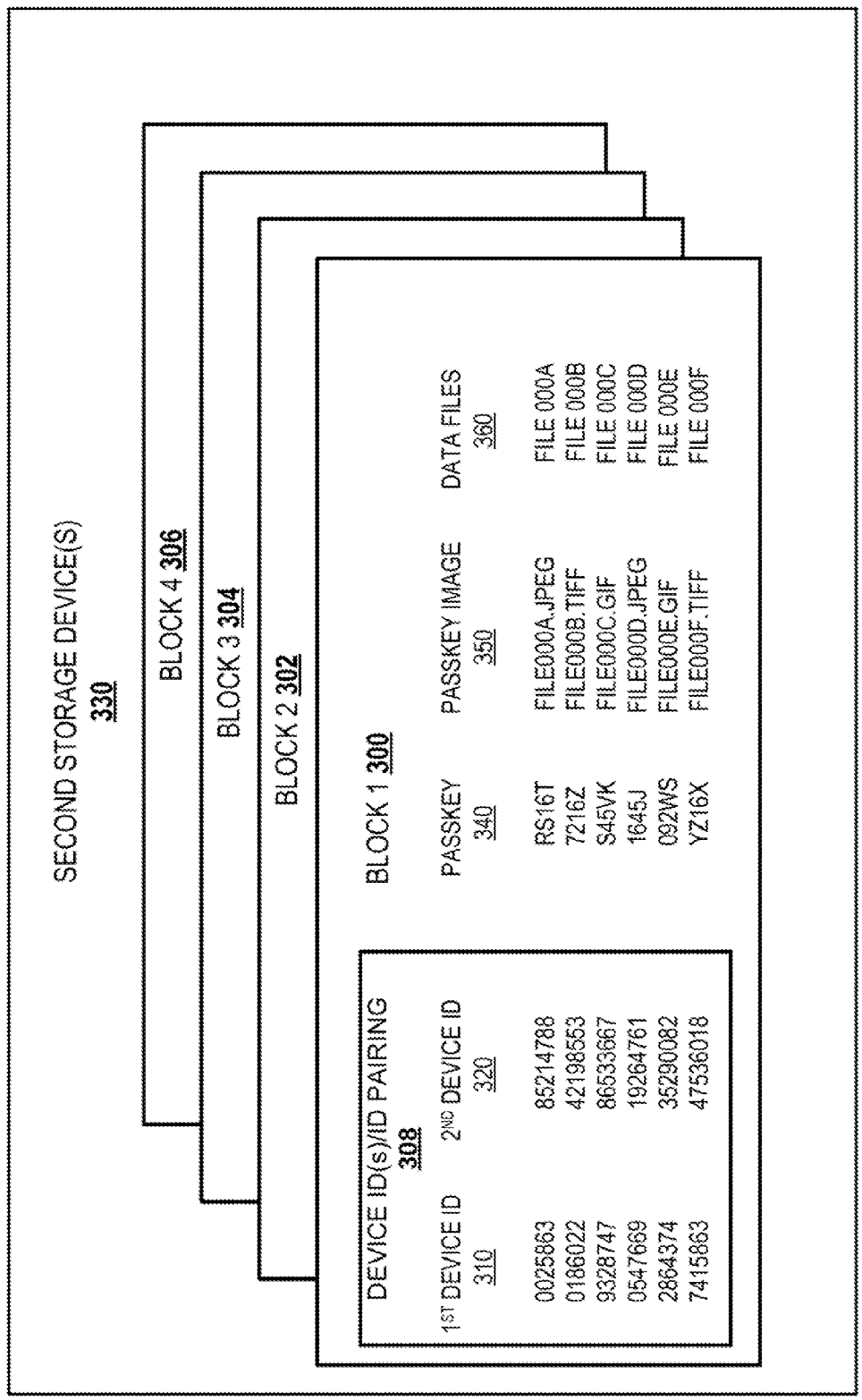
FIG. 3 illustrates the contents of example storage blocks contained on a second storage device according to one embodiment.

FIG. 3 illustrates the contents of example storage partitions or blocks 300-306 contained or stored on an example second storage device. In the discussion of FIG. 3, reference is also made to elements described in FIG. 1 and FIG. 2A-C. To simplify the description, reference is made to second storage device 330, which can apply to any one of the different storage devices illustrated within FIGS. 1 and 2A-2C as either local storage device 130, remote storage device 144, or cloud storage device 244. For a particular implementation, second storage device(s) 330 can be one or more of local storage device 130 and/or remote storage device 144 and/or cloud storage device 244. Second storage device(s) 330 are divided into several logical storage units called storage partitions or blocks for storing data, including block 1 300, block 2 302, block 3 304, and block 4 306. Each of blocks 300-306 can store information and/or data that are transmitted from DPS 100 to second storage device(s) 330. In one embodiment, storage blocks 300-306 can be stored on only one of local storage device 130 or remote storage device 144 or cloud storage device 244. For example, in one embodiment, storage blocks 300-306 are stored on only one of local storage device 130 and/or remote storage device 144 and/or cloud storage device 244.

Various types of information and data are stored in blocks 300-306. Block 1 300 illustrates the storage of a $1^{st}$ device identifier (ID) 310, $2^{nd}$ device identifier (ID) 320, passkey 340, passkey image 350, and encrypted data files 360. $1^{st}$ Device ID 310 identifies the specific first storage device 234 that is the source of data 236. $2^{nd}$ Device ID 320 identifies the computer performing the pass-word protected storage and/or the storage location where data 236 is stored. In one embodiment, $2^{nd}$ device ID 320 identifies the computer or data processing system 100 that is receiving the data 236. In another embodiment, $2^{nd}$ device ID 320 identifies the second storage device(s) 330 that is receiving the data 236 from DPS 100 and on which the password-protected version of the data 236 is eventually stored as a data file 360. In an additional embodiment, $2^{nd}$ device ID 320 identifies a combination of the computer or DPS 100 and the specific second storage device(s) 330 on which the corresponding password-protected data file 360 is stored. In one embodiment, $1^{st}$ device ID 310 and $2^{nd}$ device ID 320 are linked or bound to each other to define a device identifier (ID) pairing 308. In a related embodiment, DPS 100 can track device ID pairing 308 in order to determine a location of the stored password-protected data files 360 and/or to enable syncing of updates to the data 236 at first storage device 234. According to one aspect of the disclosure, a hash of each of the above device IDs is generated and maintained within the storage block 300 in place of the complete device ID. Thus, each device ID illustrated within FIG. 3, as well as the pairing of the device IDs, can be interchangeably referred to as a device ID hash, which are synonymous with device ID hash 239 (FIGS. 2A-2C).

Data files 360 are generated by DPS 100 from data 236. According to one embodiment, DPS 100 reads or receives data 236 from first storage device 234 and SDS utility 124 triggers DPS 100 to perform the various functions illustrated by the flow charts, described hereafter. DPS 100 can subsequently store the received data 236 within a password-encrypted data file 360 on the available second storage device 130/144/244, which can be selected by SDS utility 124 based on a pre-configured selection parameters.

Passkey 340 is a string of alphanumeric characters that are linked or associated with data files 360. In one embodiment, passkey 340 can also be associated with one or more of $1^{st}$ device ID 310 and $2^{nd}$ device ID 320 and/or device ID pairing 308. Passkey 340 is used to allow subsequent access to data files 360. In one embodiment, the data files 360 are encrypted with the generated passkey 340 prior to storing the data files 360 on the second storage device 130/144/244. With this embodiment, the passkey 340 is the decryption key, and correct entry of the passkey is required with any request to access the data file 360 on the second storage device 130/144/244 and/or to decrypt the data files 360 and make the native data 236 available/accessible to a requestor.

In one embodiment, passkey image file 350 is a picture or image file that corresponds to and includes a visual representation of passkey 340. In an alternative embodiment, passkey image file 350 can be a text based file. In FIG. 3, passkey image file 350 is shown as one of multiple different types of image file types. As illustrated, passkey image file 350 can have a variety of image file formats such as tagged image file format (TIFF), graphics interchange format (GIF) or joint photographic experts group (JPEG) format. In the described embodiments, passkey image file 350 contains a human readable image of the passkey 340. Passkey image file 350 allows a user of electronic device 230 or of a separate media reader with a display (for removable first storage devices 234) to access and view passkey image file 350 on a display, such as display 232, and to read, retrieve and/or access passkey 340 from passkey image file 350. Passkey image file 350 and passkey 340 are used to allow a user with access to the first storage device 234 to retrieve the passkey 340 via visual inspection of passkey image file 350, in order to utilize the passkey to access passkey-protected and/or passkey-encrypted data files 360 containing a copy of data 236 at second storage device 130/144/244.

Figure 4:
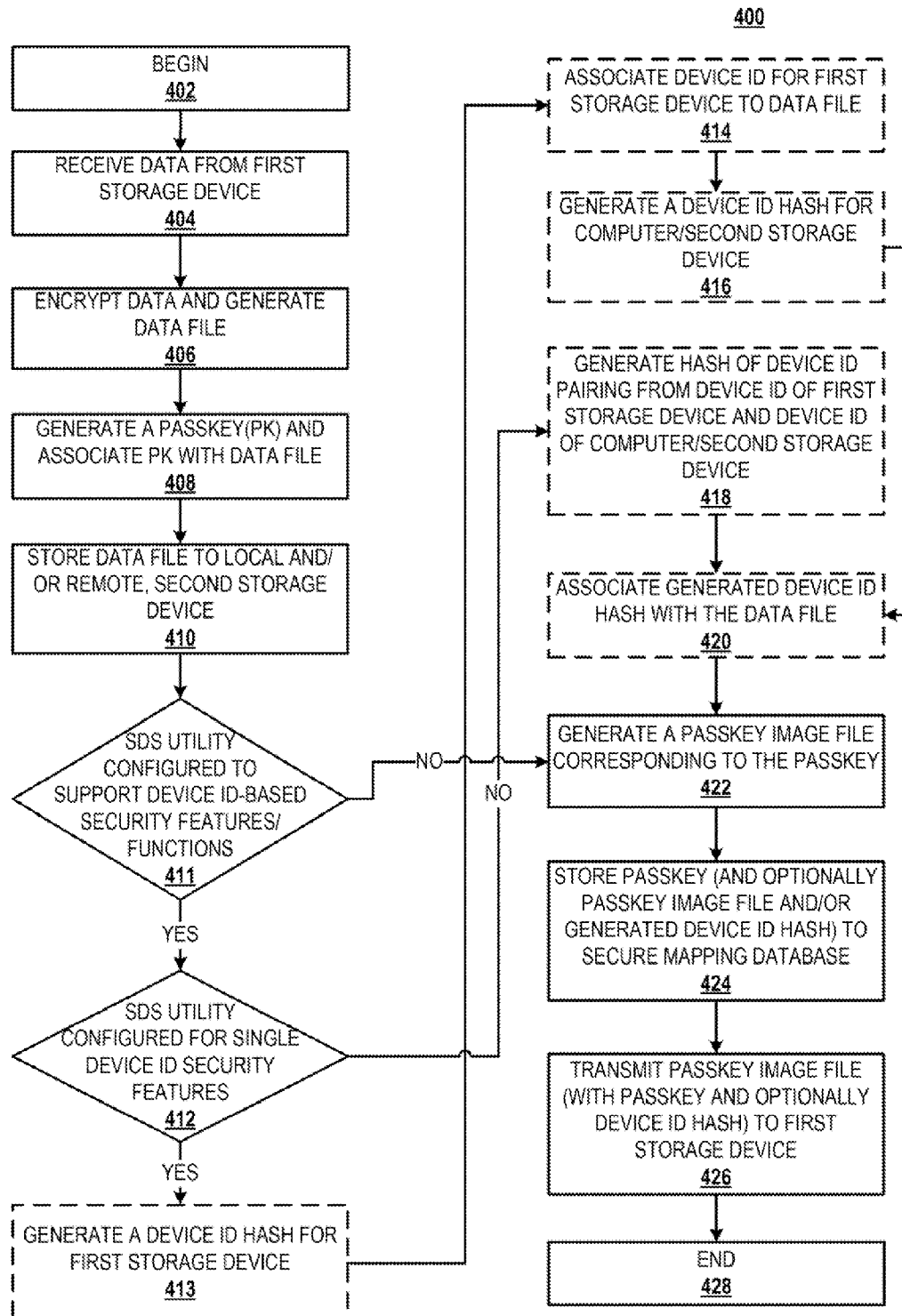
FIG. 4 provides a flowchart illustrating the method processes for storing data from a first storage device to a second storage device according to one embodiment.

FIG. 4 illustrates a flowchart of an exemplary method process for receiving data 236 from a first storage device and transferring and storing the data in a secure manner on a second storage device according to an illustrative embodiment. In the discussion of FIG. 4, reference is made to elements described in FIG. 1, FIGS. 2A-2C and FIG. 3. Computer implemented method 400 can be implemented in DPS 100 via processor execution of code from SDS utility 124 and cryptographic algorithm 126. As shown in FIG. 1, software instructions and code to execute computer implemented method 400 can be stored on system memory 120 for execution by CPU 110. In an embodiment, computer implemented method 400 can provide for secure storage of data files on a second storage device such as illustrated storage devices 130, 144, and/or 244.

The method of FIG. 4 begins at block 402. DPS 100 receives data 236 from first storage device 234 (block 404). CPU 110 encrypts the received data 236 and generates an encrypted data file 360 (block 406). In one embodiment, received data 236 is processed by cryptographic algorithm 126 or cipher to generate encrypted data file 360. CPU 110 generates a passkey 340 and associates or links the passkey 340 with the data file 360 (block 408). In one embodiment, CPU 110 performs the passkey generation prior to data encryption and then assigns the generated passkey 340 as the decryption key for later access to the encrypted data file 360. CPU 110 causes the encrypted data file 360 to be forwarded to and stored on a selected second storage device, which can be one or more of local storage device 130, remote storage device 144, and/or cloud storage device 244 (block 410). For remote and/or cloud based second storage devices, DPS 100 can transmit the data file 360 via network 140, in one embodiment. Consequently, encrypted data file 360 is written or stored to either the local storage device 130 or remote/cloud storage device 144/244 as data file 360.

According to one or more embodiments, in which the SDS utility 124 is configured to utilize device IDs and/or device ID pairings (or hashes thereof) as a part of the security features when storing a received file, CPU determines at block 411 whether the SDS utility is configured to support use of device ID-based file access security. In response to the SDS utility being so configured, CPU 110 further determines at block 412 whether the device ID-based file access security involves use of a single device ID, rather than a device ID pairing. In response to the device ID-based security involving a single device ID, CPU 110 generates a $1^{st}$ device ID 310 (or $1^{st}$ device ID hash) that corresponds to the specific first storage device 234, and which identifies the source of the data 236 (block 413). CPU 110 associates or binds the $1^{st}$ device ID 310 with the data file 360 as the source of the corresponding data 236 (block 414). Alternatively and/or in addition to generating the $1^{st}$ device ID hash, at block 416, CPU 110 generates a $2^{nd}$ device ID 320 (or $2^{nd}$ device ID hash) that corresponds to the specific computer and/or second storage device(s) 330 that is receiving data from first storage device 234 and/or at which the data file 360 is stored. CPU 110 then associates or links the $2^{nd}$ device ID hash with the corresponding data file 360 (block 416). According to one implementation, in response to the SDS utility being configured to support a paired device ID security feature, CPU 110 associates (e.g., links or binds) the $1^{st}$ device ID 310 and the $2^{nd}$ device ID 320 (or hashes thereof) to generate a device identifier (ID) pairing 308 (block 418). The generated device ID hash 239 from one or more of blocks 413, 416, or 418 is associated or linked with the corresponding data file 360 by CPU 110 (block 420).

At block 422, CPU 122 generates a passkey image file 350 corresponding to the generated passkey 340. The passkey image file 350 contains a human readable image of the passkey 340, and can also contain a human readable image of the generated device ID hash 239 when the SDS utility is configured to provide device ID security features. In one embodiment, CPU 110 causes the passkey 340 to be transmitted to a secure database at which a mapping is maintained of passkeys and their associated data file identifier (ID) (block 424). According to one aspect of the disclosure, the secure mapping database can be located within local storage device 130 and/or remote storage device 144 and/or cloud storage device 244. In an optional embodiment, CPU 110 causes the passkey 340, as well as the device ID hash 239 and passkey image file 350 to be transmitted for storage at the secure mapping database. At block 426, CPU 110 forwards/transmits passkey image file 350 to first storage device for storage thereon. In one embodiment, CPU 110 also forwards/transmits device ID hash 239 to first storage device for use during subsequent syncing of updates to data 236 with content stored within the corresponding data file 360. Computer implemented method 400 ends at block 428. Computer implemented method 400 thus enables data processing system 100 to distribute a passkey image file 350 containing an image of a passkey 340 as well as a device ID hash 239 to the first storage device 234 of the source device.

In one embodiment, rather than generating a separate device ID hash and passkey, CPU 110 hashes one or both of the $1^{st}$ device ID or source ID 310 and the $2^{nd}$ device ID or destination ID 320 to the passkey 340. Similarly, in the alternate embodiment, CPU 110 hashes the device identifier pairing 308 of both the $1^{st}$ device ID 310 and the second device ID 320 to the passkey 340. In each embodiment, the resulting hashed value is considered the passkey and is transmitted within the passkey image file 350 to the first storage device 234 for storage thereon (block 426).

According to one or more embodiments, the above method processes include: generating at least one of a first device identifier corresponding to the first storage device and a second device identifier corresponding to at least one of the computer and the second storage device; associating the generated at least one of the first device identifier and the second device identifier with the data file stored at the second storage device; and forwarding, within the passkey image file, a second security parameter for storage on the first storage device. The second security parameter is a specific parameter from among the generated at least one of the first device identifier and the second device identifier, a first device ID hash of the generated at least one of the first device identifier and the second device identifier, and a second device ID hash of a pairing of the first device identifier and the second device identifier. Also, the second security parameter is associated with at least one of the passkey and passkey image file and identifies at least one of the first storage device and the second storage device associated with the data file. The second security parameter is then utilized and/or required to enable subsequent retrieval of and access to the data file at the second storage device.

In one embodiment, the method further includes: identifying a second security parameter from among at least one of a first device identifier corresponding to the first storage device, a second device identifier corresponding to the second storage device, and a pairing of the first device identifier and the second device identifier; generating at least one of (a) a device ID hash from hashing the second security parameter and (b) a hashed passkey by hashing the second security parameter with the passkey; associating at least one of the second security parameter, the device ID hash, and the hashed passkey with the data file stored at the second storage device; and storing the passkey and at least one of the second security parameter, the device ID hash, and the hashed passkey on the second storage device. The method further provides for including at least one of the second security parameter, the device ID hash, and the hashed passkey within the passkey image file that is forwarded for storage on the first storage device, wherein the second security parameter, device ID hash, and hashed passkey each identifies storage device specific information required to enable subsequent retrieval of and access to the data file at the second storage device.

Figure 5:
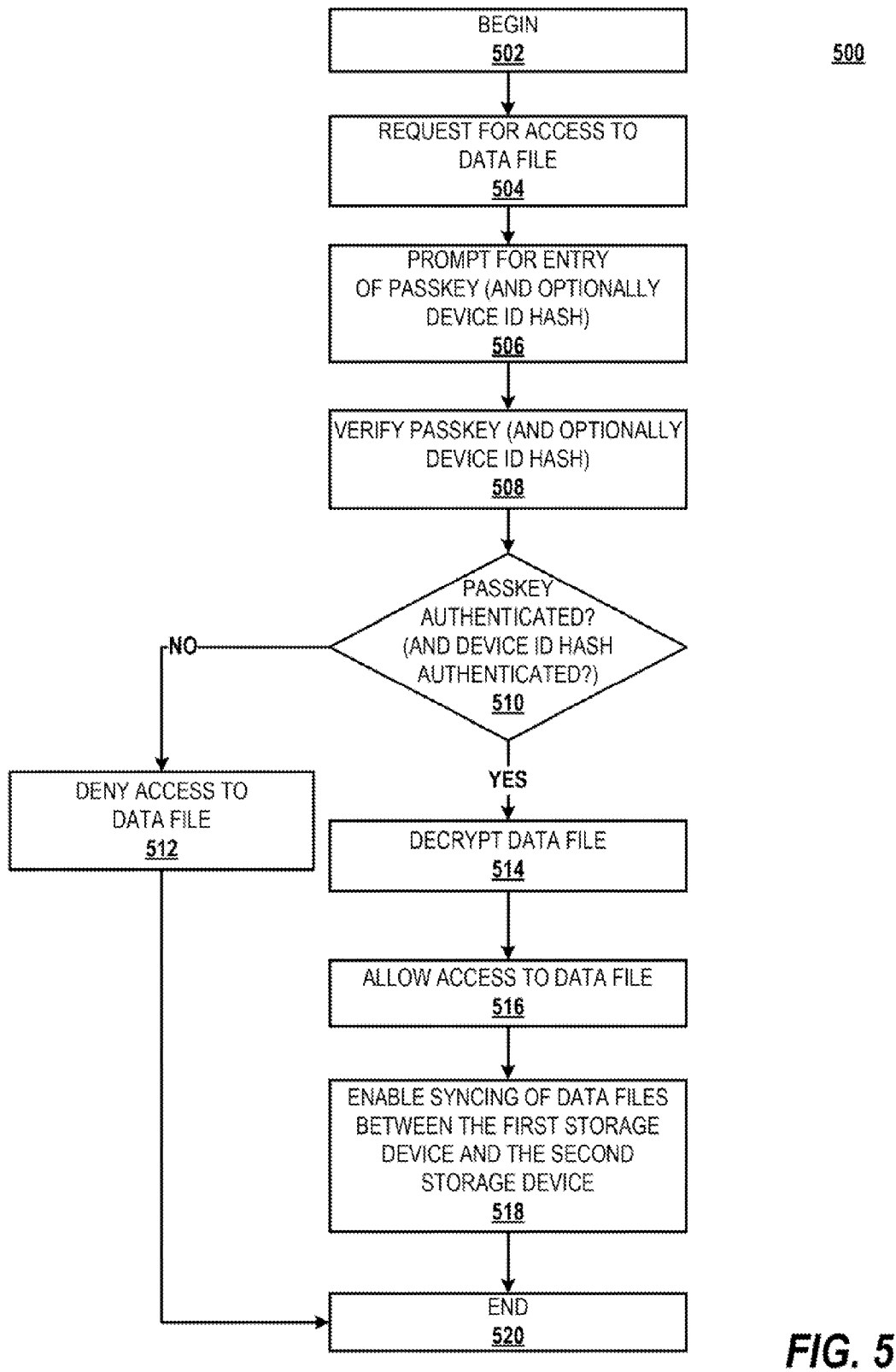
FIG. 5 provides a flowchart illustrating the method processes for enabling access to a secure data file generated by the method of FIG. 4, according to one embodiment.

FIG. 5 illustrates a flowchart of an exemplary process for managing access to stored data files on second storage device according to an illustrative embodiment. In the discussion of FIG. 5, reference is also made to elements described in FIG. 1, FIG. 2A-C and FIG. 3. Computer implemented method 500 can be implemented in DPS 100. Software instructions and code to execute computer implemented method 500 are stored on system memory 120 for execution by CPU 110. In an embodiment, computer implemented method 500 can provide for secure access to data files stored in a second storage device such as storage devices 130, 144, and 244.

The method of FIG. 5 begins at block 502. DPS 100, at block 504, receives a request to access a data file 360 that is stored on a second storage device such as local storage device 130 or second storage device 144/244. The request can be from electronic device 230 or another device that is in communication with DPS 100. In response to identifying that the requested data file is password protected and/or requires entry of a pre-established password, CPU 110 generates a prompt for entry of the passkey 340 (block 506). In an optional embodiment in which entry of a device ID hash is also required by the SDS utility 124 to gain access to the stored data file 360, CPU 110 generates a prompt for entry of the passkey 340 and the device ID hash 239. The passkey 340 and optionally the device ID hash 239 are available to only a user with access to the first storage device 234 and through a display device of the electronic device 230 in which the first storage device 234 is located. Thus, access to view the contents stored on the first storage device 234 is required in order to retrieve the passkey 340 and the device ID hash 239 (if provided and/or required) from passkey image file 350.

In response to receiving an entry of a passkey (and an entry of a device ID hash, where requested) in response to the prompt, CPU 110 verifies and/or authenticates the passkey 340 (block 508). In the alternate embodiment, where the device ID hash 239 is also required to be verified, the device ID hash 239 is also verified at block 508. This verification can be performed by CPU 110 comparing the passkey and device ID hash entered from block 508 with the passkey and device ID hash 239 stored within the secure mapping database facility associated with DPS 100.

At block 510, CPU 110 determines if the entered passkey 340 is verified or authentic. In the alternate embodiment, device ID hash 239 generated by hashing one or more of device IDs 310, 320 or device ID pairing 308 is also authenticated at block 510. If the entered passkey is not authenticated/verified as correct, CPU 110 denies access to data file 360 (block 512). Likewise, in the alternate embodiment, if the entered combination of passkey and device ID hash 239 is not correct (i.e., if any one of the two parameter values or both are incorrect), CPU 110 denies access to data file 360 (block 512). In response to correct authentication of the entered passkey, CPU 110 decrypts the data file 360 (block 514) and then allows access to the data within the data file 360 (block 516). Also, in one embodiment, if the entered version of passkey 340 is authenticated, CPU 110 enables syncing of the data with the data files 360 using the device ID pairing 308 between the first storage device 234 and local storage device 130 and/or other second storage device(s) 310 (block 518).

In one embodiment, the synching of data between the first and second storage devices can be independent of passkey 340 and can rely on a check of the device ID pairing 308 to recognize which pairing of first storage device and second storage device is involved in the original creation and storage of the data files 360 from original data within the first storage device. Computer implemented method 500 ends at block 520.

In the general implementation involving use of only a passkey for security verification, computer implemented method 500 allows data processing system 100 to respond to a request for access to data files stored on a second storage device via the processes of method 400, by prompting for entry of the passkey associated with the requested data file, and allowing access to and/or decryption of the data file only in response to authentication and/or verification of the entered passkey as being the passkey 340 provided within the passkey image file 238 that was stored on the first storage device 234.

According to the more integrated embodiment, in response to detecting an attempt to access the data file, the method involves determining a configuration setting for accessing the data file from among one or more alternate configuration settings. The method further includes generating a prompt, based on the configuration setting, for entry of at least one of: the passkey; the passkey and the first device identifier; the passkey and the second device identifier; and the passkey and the first and second device identifiers. With the entries received, the method further involves verifying that one or more entries received in response to the prompt provides correct security data that is associated with the data file. According to one aspect of the integrated embodiment, the verifying comprises: in response to the configuration setting requiring only a correct entry of a passkey, verifying that the one or more entries is the passkey by comparing the one or more entries to a stored passkey; and in response to the configuration setting requiring a correct entry of both a passkey and a second security parameter, verifying that the one or more entries includes both a correct passkey and a correct second security parameter. It is further appreciated that this second verification process can involve multiple sub-processes, such as (a) verifying the passkey and the first device identifier, in response to the configuration setting requiring correct entry of a passkey and a first device identifier and the correct passkey and the first device identifier being entered; (b) verifying the passkey and the second device identifier, in response to the configuration setting requiring correct entry of a passkey and a second device identifier the correct passkey and the second device identifier being entered; and (c) verifying the device IP pairing where the pairing is required along with the passkey.

With the integrated embodiment, the method further comprises: allowing access to the data file in response to a successful verification that the one or more entries provides correct security data; and denying access to the data file in response to a failure of the verification of the one or more entries.

One or more of the described embodiments provide a method and system for secure access to data files copied from a first storage device to a backup computer storage device or cloud virtual data storage system. A computer receives data from a first storage device that is in communication with the computer. The data is encrypted and stored as a data file to a second storage device. A passkey is generated and associated with the data file. A passkey image file corresponding to the passkey is generated. The passkey image file with the passkey is transmitted to the first storage device for storage. Subsequent access to the data file on the second storage device requires entry of the passkey, and the passkey is only accessible to a user that has access to read the passkey image file on the first storage device.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, or method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all functional elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
  receiving data from a first storage device that is communicatively coupled to a computer;
  storing a data file to a second storage device;
  generating a passkey and associating the passkey with the data file;
  generating a passkey image file corresponding to the passkey; and
  transmitting the passkey image file for storage on the first storage device, wherein the passkey is only accessible to a user having access to read the passkey image file on the first storage device and entry of the passkey is required to gain access to the data file on the second storage device.

2. The method of claim 1, further comprising encrypting the data file, wherein content of the data file is encrypted and stored in an encrypted format and wherein the content can only be decrypted by entry of the passkey.

3. The method of claim 1, further comprising:
  generating at least one of a first device identifier (ID) corresponding to the first storage device and a second device identifier (ID) corresponding to at least one of the computer and the second storage device;
  associating the generated at least one of the first device identifier and the second device identifier with the data file stored at the second storage device; and
  forwarding, within the passkey image file, a second security parameter from among the generated at least one of first device identifier and the second device identifier, a first device ID hash of the generated at least one of the first device identifier and the second device identifier, and a second device ID hash of a pairing of the first device identifier and the second device identifier, for storage on the first storage device, wherein the second security parameter is associated with at least one of the passkey and passkey image file and identifies at least one of the first storage device and the second storage device associated with the data file to enable subsequent retrieval of and access to the data file at the second storage device.

4. The method of claim 1, further comprising:
identifying a second security parameter from among at least one of a first device identifier (ID) corresponding to the first storage device, a second device identifier (ID) corresponding to the second storage device, and a pairing of the first device identifier and the second device identifier;
generating at least one of (a) a device ID hash from hashing the second security parameter and (b) a hashed passkey by hashing the second security parameter with the passkey;
associating at least one of the second security parameter, the device ID hash, and the hashed passkey with the data file stored at the second storage device;
storing the passkey and at least one of the second security parameter, the device ID hash, and the hashed passkey on the second storage device; and
including at least one of the second security parameter, the device ID hash, and the hashed passkey within the passkey image file that is forwarded for storage on the first storage device, wherein the second security parameter, device ID hash, and hashed passkey each identifies storage device specific information required to enable subsequent retrieval of and access to the data file at the second storage device.

5. The method of claim 1, further comprising:
generating a first device identifier corresponding to the first storage device;
generating a second device identifier corresponding to the computer;
binding the first device identifier to the second device identifier to generate a device identifier pairing;
associating the device identifier pairing with the data file at the second storage device;
transmitting the device identifier pairing for storing on the first storage device; and
enabling syncing of data between the first storage device and the second storage device via the computer utilizing the device identifier pairing.

6. The method of claim 1, further comprising:
in response to receiving a request for access to the data file, generating a prompt for entry of the passkey;
verifying that an entry provided in response to the prompt is the passkey associated with the data file; and
in response to the entry being verified, allowing access to the data file.

7. The method of claim 6, further comprising: in response to the provided entry not being verified as the passkey, denying access to the data file.

8. The method of claim 5, further comprising:
in response to detecting an attempt to access the data file, determining a configuration setting for accessing the data file from among one or more alternate configuration settings and generating a prompt, based on the determined configuration setting, for entry of at least one of:

(a) the passkey;
(b) the passkey and the first device identifier;
(c) the passkey and the second device identifier; and
(d) the passkey and the first and second device identifiers;
verifying that one or more entries received in response to the prompt provides correct security data that is associated with the data file, wherein the verifying comprises:
in response to the determined configuration setting requiring only a correct entry of a passkey, verifying that the one or more entries is the passkey by comparing the one or more entries to a stored passkey;
in response to the determined configuration setting requiring a correct entry of both a passkey and a second security parameter, verifying that the one or more entries includes both a correct passkey and a correct second security parameter; and
allowing access to the data file in response to a successful verification that the one or more entries provides correct security data; and
denying access to the data file in response to a failure of the verification of the one or more entries.

9. The method of claim 1, wherein the second storage device is a storage device that is accessible to a plurality of users.

10. The method of claim 9, wherein the second storage device is located at a storage facility that is remote from the computer and wherein the second storage device is a portion of a virtualized cloud storage pool.

11. A data processing system comprising:
a memory having a set of instructions located therein;
a processor in communication with the memory, the processor operable to execute the set of instructions which cause the processor to:
in response to receiving data from a first storage device that is communicatively coupled to the data processing system, store a data file to a second storage device;
generate a passkey and associate the passkey with the data file;
generate a passkey image file corresponding to the passkey; and
transmit the passkey image file for storage on the first storage device, wherein access to the data file on the second storage device requires entry of the passkey and wherein the passkey is only accessible to a user having access to read the passkey image file on the first storage device.

12. The data processing system of claim 11, further comprising instructions that cause the processor to encrypt the data file, wherein content of the data file is encrypted and stored in an encrypted format and wherein the content can only be decrypted by entry of the passkey.

13. The data processing system of claim 11, further comprising instructions that cause the processor to:
generate at least one of a first device identifier (ID) corresponding to the first storage device and a second device identifier (ID) corresponding to at least one of the data processing system and the second storage device;
associate the generated at least one of the first device identifier and the second device identifier with the data file stored at the second storage device; and
forward, within the passkey image file, a second security parameter from among the generated at least one of first device identifier and the second device identifier, a first device ID hash of the generated at least one of the first device identifier and the second device identifier, and a second device ID hash of a pairing of the first device identifier and the second device identifier, for storage on the first storage device, wherein the second security parameter is associated with at least one of the passkey and passkey image file and identifies at least one of the first storage device and the second storage device associated with the data file to enable subsequent retrieval of and access to the data file at the second storage device.

14. The data processing system of claim 11, further comprising instructions that cause the processor to:
    identify a second security parameter from among at least one of a first device identifier (ID) corresponding to the first storage device, a second device identifier (ID) corresponding to the second storage device, and a pairing of the first device identifier and the second device identifier;
    generate at least one of (a) a device ID hash from hashing the second security parameter and (b) a hashed passkey by hashing the second security parameter with the passkey;
    associate at least one of the second security parameter, the device ID hash, and the hashed passkey with the data file stored at the second storage device;
    store the passkey and at least one of the second security parameter, the device ID hash, and the hashed passkey on the second storage device; and
    include at least one of the second security parameter, the device ID hash, and the hashed passkey within the passkey image file that is forwarded for storage on the first storage device, wherein the second security parameter, device ID hash, and hashed passkey each identifies storage device specific information required to enable subsequent retrieval of and access to the data file at the second storage device.

15. The data processing system of claim 11, further comprising instructions that cause the processor to:
    generate a first device identifier corresponding to the first storage device;
    generate a second device identifier corresponding to the data processing system;
    bind the first device identifier to the second device identifier to generate a device identifier pairing;
    associate the device identifier pairing with the data file at the second storage device;
    transmit the device identifier pairing for storing on the first storage device; and
    enable syncing of data between the first storage device and the second storage device via the data processing system utilizing the device identifier pairing.

16. The data processing system of claim 11, further comprising instructions that cause the processor to:
    in response to receiving a request for access to the data file, generate a prompt for entry of the passkey;
    verify that an entry provided in response to the prompt is the passkey associated with the data file; and
    in response to the provided entry being verified, allow access to the data file.

17. The data processing system of claim 16, further comprising instructions that cause the processor to: in response to the provided entry not being verified as the passkey, deny access to the data file.

18. The data processing system of claim 11, further comprising instructions that cause the processor to:
    in response to detecting an attempt to access the data file, generate a prompt for entry of the passkey and the first device identifier;
    verify that entries received in response to the prompt are the passkey and the first device identifier associated with the data file; and
    in response to received entries being verified, allow access to the data file.

19. The data processing system of claim 11, wherein the second storage device is a storage device that is accessible to a plurality of users.

20. The data processing system of claim 19, wherein the second storage device is located at a storage facility that is remote from the data processing system and wherein the second storage device is a portion of a virtualized cloud storage pool.

* * * * *